| United States Patent [19] | [11] Patent Number: 4,861,677 |
|---|---|
| Lee | [45] Date of Patent: Aug. 29, 1989 |

[54] COEXTRUDABLE ADHESIVE FOR POLYSTYRENE, AND PRODUCTS THEREFROM

[75] Inventor: I-Hwa Lee, Wilmington, Del.

[73] Assignee: E. I. Du Pont de Nemours and Company, Wilmington, Del.

[21] Appl. No.: 202,033

[22] Filed: Jun. 3, 1988

[51] Int. Cl.$^4$ ..................... C08L 51/04; C08L 51/06
[52] U.S. Cl. ..................................... 428/516; 525/71; 525/74; 525/78; 525/80; 525/81
[58] Field of Search .................. 525/71, 74; 428/516

[56] References Cited

U.S. PATENT DOCUMENTS 4,576,995  3/1986  Nakabayashi et al. ............ 525/285

FOREIGN PATENT DOCUMENTS 53-018653  2/1978  Japan .
54-057582  5/1979  Japan .
58-203043  11/1983  Japan .
59-055743  3/1984  Japan .

Primary Examiner—Carman J. Seccuro

[57] ABSTRACT

A blend of ethylene vinyl acetate copolymer, ethylene vinyl acetate copolymer modified by grafting with a comonomer containing pendant acid or acid derivative functionality, and impact-modified polystyrene provides a useful adhesive particularly for bonding polystyrene to gas barrier polymers.

12 Claims, No Drawings

COEXTRUDABLE ADHESIVE FOR POLYSTYRENE, AND PRODUCTS THEREFROM

BACKGROUND OF THE INVENTION

The invention relates to an extrudable adhesive composition of ethylene vinyl acetate copolymer, modified ethylene vinyl acetate copolymer (EVA), and styrene homopolymer, useful for bonding polystyrene to gas barrier polymers.

Laminates of polystyrene and a gas barrier resin, using adhesives containing EVA modified with ethylenically unsaturated carboxylic acid or anhydride are known in the art. For example, U.S. Pat. No. 4,576,995, to Nakabayashi et al., discloses an adhesive for bonding ethylene/vinyl alcohol copolymer and polystyrene, which comprises a modified ethylene/vinyl acetate copolymer obtained by graft-copolymerizing a styrenic vinyl monomer and an alpha, beta-unsaturated carboxylic acid to an ethylene/vinyl acetate copolymer. Laminates prepared therefrom are valuable as a deep draw forming material with enhanced gas barrier properties.

Japanese application No. 53018653 (reported as Derwent Abstract No. 26079A/14) describes a low temperature heat sealing adhesive consisting of 100 parts carboxylated ethylene vinyl acetate copolymer and 3-100 parts styrene resin of molecular weight 500-1000.

Japanese application No. 54057582 (reported as Derwent Abstract No. 46260B/25) discloses a resin laminate of a polystyrene resin layer, a layer of ethylene-vinyl acetate copolymer saponification product, and a layer of a styrene/butadiene block copolymer containing 60% butadiene, ethylene vinyl acetate copolymer (6 mol % VA), and a maleic anhydride-ethylene vinyl acetate graft copolymer (3 mol % VA).

Japanese application No. 58203043 (reported as Derwent Abstract No. 84-008480/02) discloses a similar laminate, in which the adhesive layer is a blend of polystyrene, ethylene-vinyl acetate copolymer (5-50 % VA), and a polyolefin grafted with e.g. maleic anhydride.

Japanese application No. 59055743 discloses a process for production of resin laminates characterized by melt coextrusion of a styrene group resin layer, a gas barrier resin layer such as saponified ethylene-vinyl acetate copolymer, and a bonding layer of (a)ethylene-vinyl acetate copolymer graft-modified with unsaturated carboxylic acid or anhydride, and (b) ethylene-vinyl acetate copolymer which is graft-modified with e.g. styrene, or further (c) unmodified ethylene-vinyl acetate copolymer.

SUMMARY OF THE INVENTION

The present invention provides an extrudable bonding resin composition consisting essentially of:

(a) about 55 to about 80 percent by weight of an ethylene vinyl acetate copolymer portion consisting essentially of (i) 0 to about 99 percent by weight of a copolymer of about 60 to about 87 weight percent ethylene and about 13 to about 40 weight percent vinyl acetate comonomer, and (ii) about 1 to 100 percent by weight of a copolymer of at least about 50 weight percent ethylene; about 3 to about 50 weight percent vinyl acetate comonomer, the amount of said vinyl acetate comonomer being within about 10 percent of the amount of vinyl acetate comonomer in copolymer (i), if present; and a grafted comonomer containing pendant carboxylic acid or carboxylic acid derivative functionality, wherein the amount of said grafted comonomer comprises about 0.03 to about 0.5 percent by weight of the total composition and the total amount of copolymerized vinyl acetate of (i) and (ii) exceeds about 13.5 percent by weight of the total composition; and (b) about 20 to about 45 percent by weight of an impact modified polystyrene having a molecular weight of greater than 50,000.

The present invention further provides a laminated structure comprising at least one structural layer, at least one barrier layer, and at least one layer of the above resin composition used as a bonding layer. Such structures exhibit desirable combinations of structural strength and barrier properties, with excellent adhesion between the layers.

DETAILED DESCRIPTION OF THE INVENTION

The extrudable bonding resin of the present invention comprises a blend of about 55 to about 80 percent by weight of an ethylene vinyl acetate (EVA) component and about 20 to about 45 weight percent of a polystyrene component. The EVA component comprises an EVA copolymer grafted with pendant acid or acid derivative functionality. This grafted copolymer may be blended, if desired, with additional ungrafted EVA. Such blending may be desirable in order to minimize the amount of the relatively more expensive grafted EVA material, while maintaining the excellent adhesive properties of the composition.

The ungrafted EVA copolymer is present in amounts of 0 to about 99, and preferably about 50 to about 97 percent by weight of the EVA portion of the composition. This component is a copolymer containing about 13 to about 40, and preferably about 25 to about 35 weight percent copolymerized vinyl acetate. The balance of the copolymer is substantially copolymerized ethylene. The melt index of the copolymer, as measured by ASTM D1238 Condition "E", should be about 0.5 to about 40. Outside of these ranges, processing becomes more difficult, and flow instabilities may result.

The other polymer of the EVA component is an EVA copolymer similar to that described above, onto which has been grafted a comonomer containing pendant carboxylic acid or carboxylic acid derivative functionality. The amount of vinyl acetate comonomer present in the graft copolymer should be between about 3 and about 50 weight percent, preferably between about 15 and about 35 weight percent. In order to achieve good peel strength in laminates prepared from the present adhesive, the amount of copolymerized vinyl acetate in the grafted EVA copolymer should be within about 10 percent of the amount of copolymerized vinyl acetate in the nongrafted EVA copolymer, if present. That is to say that the percentage of copolymerized vinyl acetate in the grafted EVA copolymer should be within about 10 absolute percentage points of the amount in the ungrafted material. Thus if the ungrafted EVA contains 28% copolymerized vinyl acetate, the grafted material should contain between 18 and 38% copolymerized vinyl acetate. Furthermore, the total amount of copolymerized vinyl acetate in the adhesive, from both the grafted and ungrafted EVA copolymers, should exceed about 13.5 weight percent of the adhesive. If the total amount of copolymerized vinyl acetate is below about 13.5 weight percent, the adhesion of the composition to polystyrene is impaired. The melt index of this copolymer should also be about 0.5 to about 40.

The grafting monomer is selected from the group consisting of ethylenically unsaturated mono-, di-, or polycarboxylic acids and ethylenically unsaturated carboxylic acid anhydrides, including derivatives of such acids or anhydrides. Examples of the acids and anhydrides include acrylic acid, methacrylic acid, maleic acid, fumaric acid, itaconic acid, crotonic acid, itaconic anhydride, maleic anhydride, and dimethyl maleic anhydride. Examples of suitable derivatives includes salts, amides, imides, and esters of such acids or anhydrides, for example, mono- and disodium maleate and diethyl fumarate. Among the acids and anhydrides that are particularly useful are maleic anhydride and maleic acid.

The method for grafting of the comonomer onto the EVA copolymer can be any of the processes which are well known in the art. For example, grafting can be carried out in the melt without a solvent, as disclosed in copending U.S. patent application No. 07/122,359, filed Nov. 18, 1987, now abandoned or in solution or dispersion. Melt grafting can be done using a heated extruder, a Brabender TM or Banbury TM mixer or other internal mixers or kneading machines, roll mills, and the like. The grafting may be carried out in the presence of a radical initiator such as a suitable organic peroxide, organic perester, or organic hydroperoxide. The graft copolymers are recovered by any method which separates or utilizes the graft polymer that is formed. Thus the graft copolymer can be recovered in the form of precipitated fluff, pellets, powders, and the like.

The amount of monomer grafted onto the EVA copolymer is not particularly limiting, and may be as low as about 0.03 weight percent or as much as about 5 percent or even more, based on the weight of the grafted EVA copolymer. The total amount of graft comonomer in the total adhesive composition, however, is important, and should be between about 0.03 and about 0.5 weight percent of the total composition, in order to obtain superior adhesive and bonding properties.

The third component of the extrudable bonding resin composition is an impact modified polystyrene. This polystyrene component makes up about 20 to about 45, and preferably about 30 to about 45 weight percent of the composition. The polymer is impact modified by an elastomer such a polybutadiene elastomer or polybutadiene-styrene elastomer. It can be prepared by polymerizing styrene monomer in the presence of polybutadiene or styrene-butadiene elastomer, so that there arises both a physical blend as well as a graft copolymer. The polystyrene is a high molecular weight polymer, having a molecular weight greater than about 50,000.

In addition to the above mentioned components, the adhesive resin may contain small amounts of other materials commonly used and known in the art, such as antioxidants, stabilizers, and fillers.

The adhesive resin composition is prepared by blending the above described components by any suitable means, such as melt blending, extruding, etc. The composition provides excellent adhesion in a composite structure containing a structural layer of a styrene-type resin layer, a vinyl chloride resin layer, or a polycarbonate resin layer, and a barrier layer such as polyamide or ethylene vinyl alcohol copolymer. Structures containing styrene-type resins show excellent extrudability and good forming processability over a wide range of temperatures. The combination of processability and barrier properties provided by such composite structures make them useful in applications such as packaging, disposable containers, etc.

EXAMPLES

Adhesive blends were prepared by dry blending the ingredients in a polyethylene bag and subsequently melt blending at 220° to 230° C. in a 28 or 30 mm twin screw extruder with a vacuum port. Each of the blends, listed in Table I, also contained 0.10 weight percent Irganox TM 1010 hindered polyphenol stabilizer (not separately reported in the Table).

Each of the blends was coextruded from a 25 mm single screw extruder operated at 4 to 6 r.p.m., through a coextrusion die. On one side of the blend was extruded a layer of high impact polystyrene (HIPS) from a 38 mm extruder at 8 to 12 r.p.m, and on the other side was extruded a layer of ethylene vinyl alcohol copolymer containing 33 mole percent ethylene from a 38 mm extruder at 30 to 45 r.p.m. The barrel temperature of each extruder was set at 230° C.; the chill rolls over which the extrudate was passed were maintained at 100' C. The take-up speed for the extruded sheet was about 1.5 m/min. The thickness of the layers is indicated in the Table.

The laminates thus prepared were evaluated by measuring their peel strength. Peel strength was measured by ASTM D 1876-72, modified in that the test was run at 305 mm/min, rather than 254 mm/min, and 3 to 6 duplicates of each sample were measured, rather than 10. Results from this test, in a "T" configuration, are indicated in the Table by "T." For some samples an additional measurement of peel strength was made in a similar way but using a configuration in which one of the tabs was turned back so that it was parallel to the laminate. These tests are indicated in the Table by "180."

The results in the Table show the superiority of the adhesive compositions within the scope of the present invention. Examples 1-19 represent laminates made using the adhesive of the present invention. The "T" peel strength for such laminates is at least 280 N/m, typically at least 300 N/m. Laminates prepared outside the scope of the present invention are represented in Comparative Examples C1-C23. For these laminates the "T" peel strength is typically less than 250 N/m, often much less. Comparative Example C1 has a low peel strength because the total vinyl acetate content of the EVA copolymers used in the blend was below 13.5%. Comparative Example C3 has low peel strength because the difference in the vinyl acetate level of the grafted and the ungrafted EVA copolymers is greater than 10%. Comparative Examples C4 and C5 show poor results because the grafted polymer is a modified polyethylene or a modified EPDM, rather than a modified EVA copolymer. Comparative Example C6 has poor peel strength because of the difference in the vinyl acetate content of the grafted and ungrafted EVA is greater than 10 percent, and the level of polystyrene is below 20%. Comparative Examples C7 through C9 have poor peel strengths because the blends contain less than 20% polystyrene as a component. Comparative Examples C10 through C17, on the other hand, have poor or variable peel strengths because the polystyrene component is greater than 45% of the blend. Comparative Examples C18 through C24 give low peel strengths because impact-modified polystyrene is not used: in Comparative Examples C18 and C19, unmodified or crystalline polystyrene is used; in Comparative Examples C19 through C21, styrene hydrogenated butadiene triblock copolymer with 70% butadiene is used; and in Comparative Examples C22 and C23 a styrene butadiene copolymer with 30% butadiene is used.

vinyl acetate comonomer in copolymer (i), if present; and a grafted comonomer containing pendant carboxylic acid or carboxylic acid derivative functionality, wherein the amount of said grafted comonomer comprises about 0.03 to about 0.5 percent by weight of the total composition and the total amount of copolymerized vinyl acetate of (i) and (ii) exceeds about 13.5 percent by weight of the TABLE[a]

| | HIPS THICK μm | EVOH THICK μm | ADHESIVE LAYER | | | | | | | PEEL STR | |
|---|---|---|---|---|---|---|---|---|---|---|---|
| | | | PS | | UNGRAFTED | GRAFT | | TOTAL | | THICK | T | 180 |
| EX | | | WT % | TYPE[b] | EVA, WT % | WT % | TYPE | VA WT % | MAn WT % | μm | N/m | N/m |
| 1 | 254 | 50 | 30 | H | 67.8 | 2.1 | E/25VA | 19.5 | 0.03 | 20 | 350 | 999 |
| 2 | 213 | 71 | 40 | H | 57.0 | 3.0 | E/25VA | 16.7 | 0.03 | 30 | 350 | 946 |
| 3 | 223 | 50 | 40 | H | 56.3 | 3.7 | E/25VA | 16.7 | 0.05 | 20 | 280 | 841 |
| 4 | 218 | 71 | 30 | H | 65.0 | 5.0 | E/25VA | 19.5 | 0.05 | 20 | 508 | 946 |
| 5 | 193 | 81 | 30 | H | 65.0 | 5.0 | E/18VA | 19.1 | 0.05 | 20 | 403 | 981 |
| 6 | 213 | 71 | 40 | H | 52.0 | 8.0 | E/25VA | 16.6 | 0.08 | 30 | 298 | 981 |
| 7 | 213 | 71 | 40 | H | 52.0 | 8.0 | E/25VA | 16.6 | 0.08 | 30 | 368 | 999 |
| 8 | 218 | 71 | 30 | H | 60.0 | 10.0 | E/25VA | 19.3 | 0.11 | 30 | 403 | |
| 9 | 183 | 91 | 30 | H | 55.0 | 15.0 | E/25VA | 19.2 | 0.16 | 20 | 333 | |
| 10 | 213 | 81 | 30 | H | 55.0 | 15.0 | E/18VA | 18.1 | 0.16 | 20 | 368 | |
| 11 | 193 | 61 | 30 | H | 55.0 | 15.0 | E/25VA | 19.2 | 0.16 | 41 | 315 | |
| 12 | 234 | 71 | 35 | H | 50.0 | 15.0 | E/25VA | 17.8 | 0.16 | 20 | 385 | |
| 13 | 213 | 102 | 40 | H | 53.0 | 7.0 | E/28VA | 16.8 | 0.11 | 30 | 385 | |
| 14 | 213 | 102 | 40 | M | 50.0 | 10.0 | E/25VA | 16.5 | 0.11 | 41 | 315 | |
| 15 | 193 | 71 | 40 | H | 45.0 | 15.0 | E/18VA | 15.3 | 0.16 | 30 | 385 | |
| 16 | 233 | 71 | 40 | H | 45.0 | 15.0 | E/18VA | 15.3 | 0.16 | 41 | 403 | |
| 17 | 203 | 81 | 40 | H | 35.0 | 25.0 | E/25VA | 16.1 | 0.27 | 20 | 350 | |
| 18 | 213 | 71 | 45 | H | 40.0 | 15.0 | E/25VA | 15.0 | 0.16 | 41 | 350 | |
| 19 | 203 | 71 | 45 | H | 40.0 | 15.0 | E/25VA | 13.9 | 0.16 | 36 | 385 | |
| C 1 | 213 | 86 | 30 | H | 67.1[c] | 2.9 | E/25VA | 12.8 | 0.03 | 30 | 88 | 18 |
| C 2 | 182 | 81 | 45 | H | 40.0 | 15.0 | E/9VA | 12.5 | 0.16 | 20 | 140 | 175 |
| C 3 | 200 | 80 | 30 | H | 63.0 | 7.0 | E/9VA | 17.6 | 0.11 | 30 | 18 | 53 |
| C 4 | 213 | 71 | 40 | H | 40.3 | 19.7 | PE | 11.3 | 0.10 | 30 | 263 | 105 |
| C 5 | 213 | 91 | 40 | H | 50.0 | 10.0 | EPDM | 14.0 | 0.20 | 20 | <88 | <88 |
| C 6 | 183 | 81 | 0 | H | 85.5 | 14.5 | E/9VA | 25.2 | 0.15 | 20 | 175 | |
| C 7 | 198 | 91 | 0 | H | 83.4 | 16.6 | E/28VA | 28.6 | 0.15 | 20 | 140 | |
| C 8 | 203 | 71 | 0 | H | 85.0 | 15.0 | E/18VA | 26.5 | 0.16 | 20 | 193 | |
| C 9 | 193 | 91 | 10 | H | 75.0 | 25.0 | E/18VA | 23.7 | 0.16 | 20 | 228 | |
| C10 | 173 | 91 | 50 | H | 36.0 | 14.0 | E/18VA | 12.6 | 0.15 | 30 | 333 | |
| C11 | 203 | 56 | 50 | H | 34.9 | 15.1 | E/25VA | 13.5 | 0.16 | 30 | 105 | |
| C12 | 206 | 61 | 50 | H | 0.0 | 50.0 | E/25VA | 12.5 | 0.54 | 41 | 28 | |
| C13 | 213 | 66 | 60 | H | 25.0 | 15.0 | E/25VA | 10.8 | 0.16 | 30 | 210 | |
| C14 | 218 | 71 | 60 | H | 25.0 | 15.0 | E/18VA | 9.7 | 0.16 | 30 | 158 | |
| C15 | 193 | 61 | 70 | H | 15.0 | 15.0 | E/18VA | 6.9 | 0.16 | 30 | 70 | |
| C16 | | | 70 | H | 0.0 | 30.0 | E/25VA | 7.5 | 0.32 | | 44 | |
| C17 | 234 | 81 | 85 | H | 0.0 | 15.0 | E/18VA | 2.7 | 0.16 | | 0 | |
| C18 | 224 | 81 | 40 | C | 50.0 | 10.0 | E/25VA | 16.5 | 0.11 | 30 | 228 | |
| C19 | 213 | 86 | 50 | C | 38.6[c] | 11.4 | E/25VA | 9.8 | 0.16 | 30 | 70 | |
| C20 | 203 | 91 | 30 | K | 60.0 | 10.0 | EPDM | 16.8 | 0.20 | 20 | 70 | |
| C21 | 234 | 81 | 45 | K | 45.0 | 10.0 | E/18VA | 14.4 | 0.11 | 20 | 228 | |
| C22 | 203 | 91 | 50 | K | 35.0 | 15.0 | E/18VA | 12.5 | 0.16 | 25 | 123 | |
| C23 | 213 | 81 | 40 | B | 48.0 | 12.0 | E/28VA | 16.8 | 0.11 | 30 | 88 | |
| C24 | 183 | 71 | 40 | B | 0.0 | 60.0 | E/28VA | 16.8 | 0.96 | 41 | 123 | |

[a]Blanks in the table indicate that measurements were not made.
[b]types of polystyrene -
H = high impact, N.I. 240 J/m; M = medium impact, N.I. 92 J/m;
C = crystalline, N.I. 20 J/m; B = styrene/30% butadiene copol;
K = styrene hydrogenated butadiene triblock copolymer with 70% butadiene ("Kraton" SEBS).
[c]The EVA used in these examples was a copolymer containing 18% VA (E/18VA). In other examples the EVA was E/28VA.

I claim:
1. An extrudable bonding resin composition consisting essentially of:
   (a) about 55 to about 80 percent by weight of an ethylene vinyl acetate copolymer portion consisting essentially of
      (i) 0 to about 99 percent by weight of a copolymer of about 60 to about 87 weight percent ethylene and about 13 to about 40 weight percent vinyl acetate comonomer, and
      (ii) about 1 to 100 percent by weight of a copolymer of at least about 50 weight percent ethylene; about 3 to about 50 weight percent vinyl acetate comonomer, the amount of said vinyl acetate comonomer being within about 10 percent of the amount of total composition; and
   (b) about 20 to about 45 percent by weight of an impact modified polystyrene having a molecular weight of greater than 50,000.

2. The composition of claim 1 wherein the amount of ethylene vinyl acetate portion is about 55 to about 70 weight percent and the impact modified polystyrene is about 30 to about 45 percent by weight of the composition.

3. The composition of claim 1 wherein the amount of vinyl acetate comonomer in copolymer (i) is about 25 to about 35 percent by weight.

4. The composition of claim 1 wherein the amount of vinyl acetate comonomer in copolymer (ii) is about 15 to about 35 percent by weight.

5. The composition of claim 4 wherein the carboxylic acid or carboxylic acid derivative is grafted onto polymer (ii) in an amount of about 0.05 to about 5 weight percent.

6. The composition of claim 5 wherein the carboxylic acid or carboxylic acid derivative is an ethylenically unsaturated mono, di, or polycarboxylic acid, anhydride, salt, amide, imide, or ester.

7. The composition of claim 6 wherein the carboxylic acid or carboxylic acid derivative is acrylic acid, methacrylic acid, maleic acid, fumaric acid, itaconic acid, crotonic acid, itaconic anhydride, maleic anhydride, dimethyl maleic anhydride monosodium maleate, disodium maleate, diethyl fumarate, maleic anhydride and maleic acid.

8. The composition of claim 6 wherein the carboxylic acid or carboxylic acid derivative is an anhydride.

9. The composition of claim 8 wherein the anhydride is maleic anhydride.

10. The composition of claim 1 wherein the impact modified polystyrene has an impact strength of at least about 92 J/m.

11. A laminated structure comprising at least one structural layer, at least one barrier layer, and at least one bonding layer of the extrudable bonding resin composition of claim 1.

12. The laminated structure of claim 11 wherein the structural layer is high impact polystyrene and the barrier layer is ethylene vinyl alcohol copolymer.

* * * * *